PACKAGE

Original Filed Dec. 21, 1970 2 Sheets-Sheet 1

INVENTORS
WILLIAM C. LEASURE
JOHN D. ANDREWS

BY Larson and Taylor
ATTORNEYS

PACKAGE

Original Filed Dec. 21, 1970 2 Sheets-Sheet 2

INVENTORS
WILLIAM C. LEASURE
JOHN D. ANDREWS

BY Larson and Taylor
ATTORNEYS

United States Patent Office

Re. 27,838
Reissued Dec. 11, 1973

27,838
PACKAGE

William C. Leasure and John D. Andrews, Houston, Tex., assignors to Mira-Pak, Inc., Houston, Tex.

Original No. 3,458,111, dated July 29, 1969, Ser. No. 692,568, Dec. 21, 1967. Application for reissue July 21, 1970, Ser. No. 56,827
Int. Cl. B65d *33/38*
U.S. Cl. 229—17 R 18 Claims

Matter enclosed in heavy brackets [ ] appears in the original patent but forms no part of this reissue specification; matter printed in italics indicates the additions made by reissue.

ABSTRACT OF THE DISCLOSURE

A package formed from a flat length of material, the edges of which length are connected together along a longitudinally extending seal. The package includes opposing gussets, one of which contains the longitudinally extending seal. The package is opened by separating the sides of the gusset and pulling the longitudinally extending seal, whereby the package opens and the gusset forms a pour spout. The bottom of the package may be flat.

Background—Field of the invention

This invention relates to packages. In particular it relates to improvements in packages, especially packages of the type formed from a continuous length of generally flat material.

Background—Description of the prior art

It is known to form packages from a continuous length of material by connecting together opposing edges of the said length of material along a longitudinally extending seal and subsequently forming transverse seals to close the top and bottom of the package. In such packages as known heretofore, generally the longitudinal seal has been located on either the front or the back of the package; and the opening of the package has been achieved by tearing through one of the transverse seals.

Summary of the invention

The purpose of this invention is to provide a new and improved package of the type described wherein the longitudinal seal connecting the opposing edges of the length of flat material is arranged on the side of the package and extends outwardly and wherein this seal is formed within a gusset construction to facilitate the opening of the package and the forming of a pour spout.

According to the present invention, a length of tubular material is formed in a known manner from a length of flat material with the opposing edges of the flat material connected together to form a longitudinally extending seal of finite width and directed outwardly from the surface of the package. Suitable means form a gusset on each side of the package with the longitudinal seal located in one of these gussets. With the gussets so formed, transverse seals are formed across the top and bottom of the package. If desired, the bottom of the package may be folded upwardly to form a flat bottom. In practice this flat bottom will normally be formed before product is introduced into the package.

To open the package, one merely reaches into the gusset containing the longitudinal seal, separates the upper ends thereof and pulls the longitudinal seal outwardly. Initially, this will cause the portion of the package adjacent the gusset to tear, thereby opening the package, and subsequent pulling of this seal will cause the gusset to fold outwardly thereby forming a pour spout. If desired, suitable means may be provided to cause the packaging material to tear along a predetermined path.

Thus, it is an object of this invention to provide a new and improved package.

It is still another object of this invention to provide a package having means for conveniently opening the package at one upper corner thereof and forming a pour spout.

It is still another object of this invention to provide a package of the type formed from a continuous length of flat material, the opposing edges of which are joined together along a longitudinally extending seal which cooperates with a gusset construction to facilitate the opening of the package and the forming of a pour spout.

Another object of this invention is to provide an improved gussetted, flat-bottom package.

Still another object of this invention is to provide a package having a longitudinally extending seal located at one side thereof, leaving the front and back of the package free for the advertising message.

Other objects and the attendant advantages of the present invention will become apparent from the detailed description to follow together with the accompanying drawings.

Brief description of the drawings

There follows a detailed description of a preferred embodiment of the invention together with accompanying drawings. However, it should be understood that the invention is capable of numerous modifications and variations apparent to those skilled in the art without departing from the spirit and scope of the invention.

In the drawings.

Detailed description of the preferred embodiment.

Like numerals are employed to indicate like parts throughout the several drawings.

Figure 1:
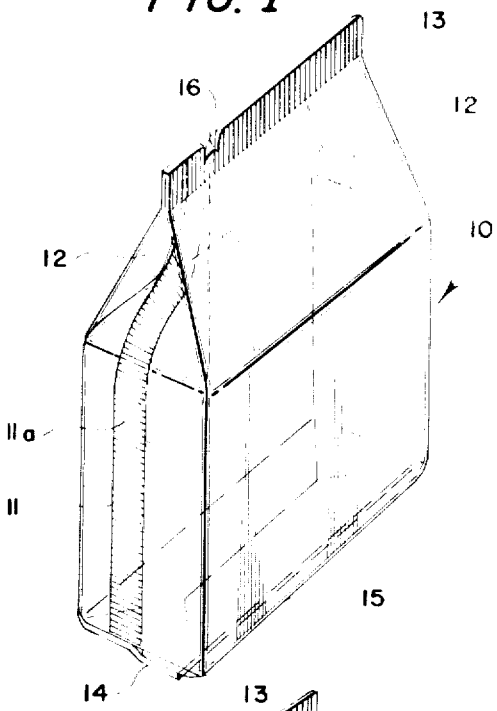
FIGURE 1 is a perspective view of a completed, unopened package constructed in accordance with the features of the present invention.

FIGURE 1 illustrates a package 10, constructed in accordance with the features of the present invention from a length of generally flat material, the opposing edges of the length having been joined together face to face at outwardly directed seal 11. The two sides of the package have been folded inwardly to form gussets 12, one on each side thereof. The top and bottom of the package are closed by upper and lower transverse seals 13 and 14, respectively. This particular package has a flat bottom 15. A notch 16, the purpose of which will be explained in greater detail below, is formed in the upper seal 13.

Figure 2:
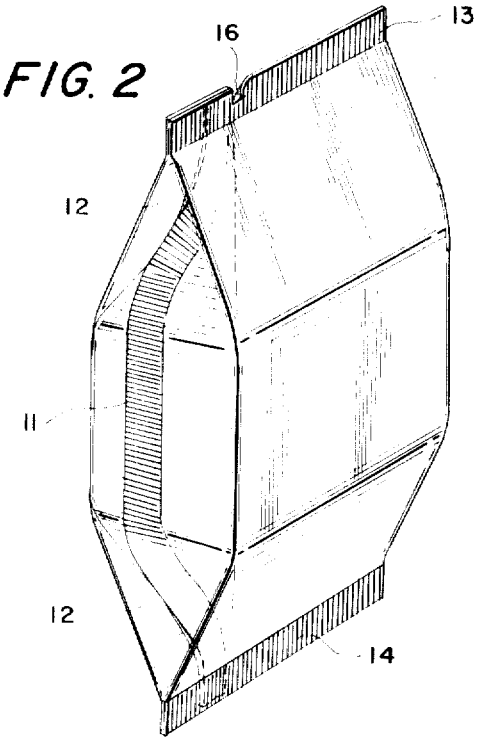
FIGURES 2 and 3 are perspective views illustrating steps in the formation of the package of FIGURE 1.
Figure 3:
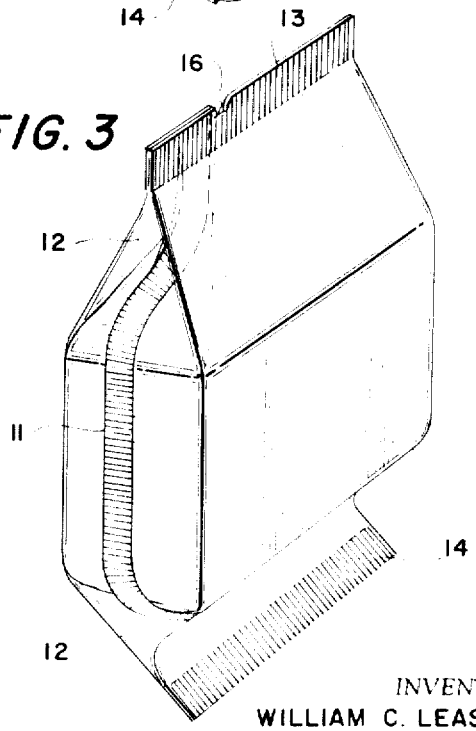

FIGURE 2 illustrates the package without a flat bottom which, nonetheless, includes certain features of the present invention. This package may be used in the form shown, or, if desired, the lower seal 14 of FIGURE 2 may be folded upwardly as shown in FIGURE 3 to form the flat bottom 15 of FIGURE 1.

It will be noted that in the finished package, either with or without the flat bottom the longitudinal seal is located on the side of the package. Consequently, both the front and the back of the package are free for printed advertising material.

Figure 4:
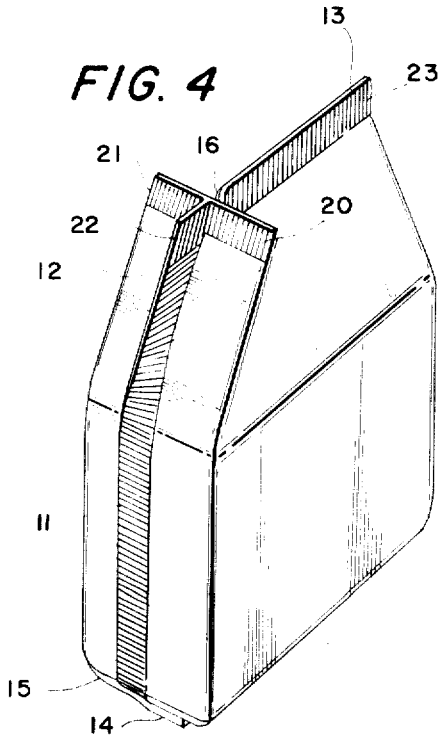
FIGURES 4 and 5 are perspective views illustrating two steps in the opening of the package of FIGURE 1.
Figure 5:
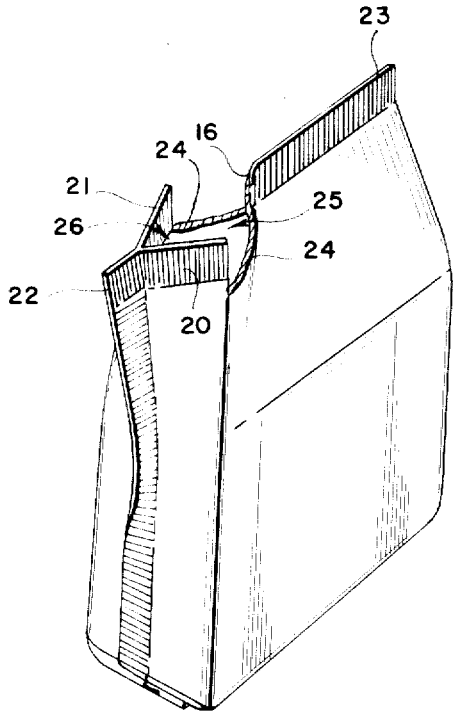
Figure 6:
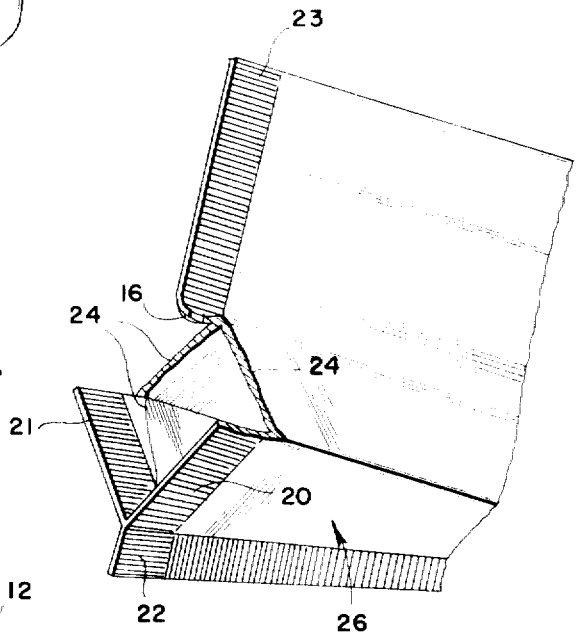
FIGURE 6 is an enlarged perspective view showing the same position as FIGURE 5 but showing the package tilted ready for pouring product.
Figure 7:
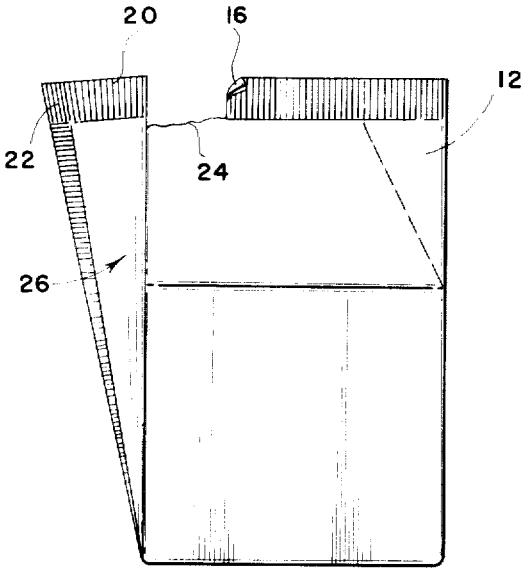
FIGURE 7 is an elevational view showing the package in the fully opened condition.

FIGURES 4–7 illustrate the simple and convenient procedure for opening the package and forming a pour spout. First, as shown in FIGURE 4, the upper ends of the gusset 12 containing the seal 11 are folded apart forming ear portions 20 and 21 and the upper end 22 of the seal 11 which forms a tab portion. The remaining portion of the seat 13 is referred to hereinafter as the main portion 23. Either before or after the ear portions 20 and 21 are separated, the main portion 23 is torn at notch 16.

The tab portion 22 is then grasped and pulled outwardly causing the portions of the package adjacent the sides of ear portions 20 and 21 facing the main portion 23 to tear along tear lines 24 (FIGURE 5) thereby forming package opening 25.

In this condition, the entire inner surface of the gusset 12 including the sides of ear portions 20 and 21 facing the main portion 23, forms a pour spout 26.

An advantage of the present invention is the convenient arrangement for closing and storing the once-opened package. The tab 22 is pushed inwardly and the ear portions 20 and 21 are brought together to the positions they occupied before the package was opened. The entire upper end of the package can then be folded about a transverse line slightly below the tear line 24. This will form a satisfactory closed, if not completely airtight, seal.

In a preferred embodiment of the invention, the package is semi-rigid. That is, it should not be completely limp. For this purpose, the package may be formed of a suitable metallic foil such as aluminum foil. Alternatively, the package may be formed of a plastic material having strengthening ribs. Another desirable feature of the present invention would include a means for causing the tear line 24 to follow a predetermined path. This could be accomplished by mechanically forming a guide path from the bottom of notch 16 across to the edge of the package. For example, the same sealing die which forms transverse seal 13 could include a mechanical bar for indenting the package at the desired location. Also, the package could be formed from a material including an oriented film such as oriented polyethylene, which orientation would cause the product to tear along the predetermined path.

In one embodiment of the invention, the packaging material itself is of a laminated construction including the following four layers, from inside to out; polyethylene, metallic foil, polyethylene, and cellophane. The inside polyethylene layer would form a permanent seal to close the package when subjected to heat and pressure. The aluminum foil would provide the necessary rigidity while the polyethylene layer on the outer surface of the aluminum foil serves as a laminate between the foil and outer cellophane layer. Finally, the outer cellophane surface provides a suitable surface for printing and forms a peel seal, that is, a seal which is not permanent and could be separated, at those portions where the outer surface of the package engages another outer surface of the package such as at the gussets 12.

Another feature includes the construction of the longitudinally extending rib 11. This is formed by a sealing die having a tooth configuration such as to give horizontal ribs. It has been found that such an arrangement simplifies the folding of the longitudinal seal 11 in the formation of the flat bottom 15.

Although the invention has been described above in considerable detail, it should be apparent that the invention is capable of numerous modifications and variations apparent to those skilled in the art without departing from the spirit and scope of the invention as defined in the claims.

We claim:

1. A generally tubular package of the type formed from a length of generally flat material having a longitudinal tube axis extending from a first end to a second end of the package, the edges of the said length being connected together along a longitudinal seal of finite width with the said edges facing the outside of the package, an elongated transverse seal extending across the package and closing the first end thereof, said traverse seal comprising a central portion and opposite outer portions at least one of said outer portions including a gussetted infolded section, and said longitudinal seal intersecting the transverse seal in the gussetted infolded section, the arrangement being such that when the central portion of the seal is broken near the gussetted section, and the longitudinal seal is pulled away from the central portion, the package tears below the outer portion of the transverse seal to open the package, and the infolded gussetted section forms a spout for pouring product from the package.

2. The package of claim 1 wherein the said outer portion of the transverse seal comprises a pair of ear portions extending outwardly from said central portion, one on each side of the longitudinal seal, said central portion being located on the side of the ear portions opposite from the longitudinal seal, said ear portions each having a first side facing the longitudinal seal and a second side facing away from the longitudinal seal, the arrangement being such that when the longitudinal seal is pulled away from the central portion, the package tears below the second side of each ear and the said second sides form the inside of the spout.

3. The package of claim 2 including means for causing the part of the package below the second side to tear along a predetermined path when the tab is pulled.

4. The package of claim 3 wherein the last said means comprises a mechanically altered portion of the package along said predetermined path.

5. The package of claim 3 wherein said package includes at least one oriented layer of film material, the orientation being such as to cause the package to tear along said predetermined path.

6. The package of claim 3 including a notch in the central portion of the transverse seal to facilitate tearing of the central portion to the means for causing the package to tear along said predetermined path.

7. The package of claim 1 wherein said second end includes a second transverse seal across said second end, said second transverse seal also including a central portion and opposite outer portions, at least one of said outer portions including a second gussetted infolded section and said longitudinal seal also intersecting said second transverse seal in said second infolded gussetted section.

8. The package of claim 7 wherein the other outer portion of each transverse seal also includes an infolded gussetted section, and wherein the second transverse seal is folded towards the first seal and attached to the package to form a generally flat second end of the package.

9. The package of claim 7 wherein said longitudinal seal includes a plurality of ribs extending perpendicular to the outer edge of said longitudinal seal.

10. The package of claim 1 wherein said tubular package is of laminated construction and includes a heat sealable inner layer for forming a permanent bond with itself, at least one intermediate layer for rendering the package semi-rigid, and an outer layer for forming a peelable seal where the outer layer engages itself.

11. The package of claim 10 wherein the outer portion of the transverse seal comprises a pair of ear portions extending outwardly from said central portion, one on each side of the longitudinal seal, said central portion being located on the side of the ear portions opposite from said longitudinal seal, each ear portion having a first side facing the longitudinal seal and a second side facing away from the longitudinal seal, said inner layer forming a permanent bond between the first and second sides of each ear portion and permanently closing the central portion of the transverse seal, and the said outer layer being adapted to hold the two first sides of the ear portions together until they are peeled apart to expose that part of the longitudinal seal which intersects the transverse seal, the arrangement being such that when the longitudinal seal is pulled away from the central portion the package tears below the second side of each ear and second sides form the inside of the pour spout.

12. The package of claim 1 wherein the second end of the package is generally flat and it extends in a plane substantially perpendicular to the tube axis.

13. The package of claim 8 wherein the first said outer portion of the first said transverse seal comprises a pair of ear portions extending outwardly from said outer portions, one to each side of the longitudinal seal, said central portion being located on the side of the ear portions opposite from the longitudinal seal, said ear portions each having a first side facing the longitudinal seal and a second side facing the central portion, the arrangement being such that longitudinal seal is pulled away from the central portion the package tears below the second side of each ear and the said second sides form the inside of the spout.

14. The package of claim 13 including means for causing the part of the package adjacent the second sides to tear along the predetermined path when the longitudinal seal is pulled outwardly.

15. A package having a generally tubular end closed by a seal formed thereacross such that opposing portions of the tubular end sealingly engage each other to close the said end; said seal including (a) a central portion extending across the package, (b) a pair of ear portions extending outwardly from said central portion, one ear portion on each side of a tab portion, each ear portion having a first side facing the tab and a second side facing away from the tab, said ears being constructed to fold against each other, and (c) the said tab portion extending outwardly away from the central portion from a point on the first sides of the ear portions said tab being located between the ear portions when they are folded against each other, such that when the tab portion is pulled away from said central portion, the package tears below the second side of the ear portions to open the package, and the second sides of the ear portions form a spout for pouring a product out of the package.

16. The package of claim 15 wherein the package is of the type formed from a length of flat material formed into a tube by connecting opposite edges of the length along the longitudinally extending seal, and wherein a part of said longitudinal seal constitutes the said tab portion.

17. A package having a lower part which is of generally rectangular cross-section including opposing first sides and opposing second sides, said package being formed from a length of flexible flat material, the edges of which material have been joined along a longitudinal seal which extends along one of said second sides from the upper end to the lower end, upper and lower transverse seals closing the upper and lower ends of the package, respectively, in-folded gusseted sections on the second sides of the packages adjacent the upper *and lower* transverse [seal] *seals,* said longitudinal seal intersecting each said transverse seal, and wherein the lower transverse seal *which is initially formed with said in-folded gusseted sections extends across the package a distance no greater than the width of said first sides, and wherein when the lower end portion of the package including the lower transverse seal* is folded upwardly toward the upper transverse seal, *it closes the said gussets adjacent the lower transverse seal* [to form] *and forms* a generally flat bottom on the package.

18. The invention of claim 17 wherein said longitudinally extending seal includes a plurality of ribs extending perpendicular to the outer edge of the said longitudinally extending seal.

References Cited

The following references, cited by the Examiner, are of record in the patented file of this patent or the original patent.

UNITED STATES PATENTS

| | | | |
|---|---|---|---|
| 3,387,701 | 6/1968 | Schneider | 229—58 |
| 3,051,368 | 8/1962 | Schneider et al. | 229—17 |
| 3,314,591 | 4/1967 | Cheeley | 229—53 |
| 3,331,692 | 7/1967 | White | 99—174 |
| 3,339,820 | 9/1967 | Krzyzanowski. | |

FOREIGN PATENTS

| | | | |
|---|---|---|---|
| 1,470,595 | 1/1967 | France | 229—17 R |
| 342,074 | 12/1959 | Switzerland | 229—58 |

DONALD F. NORTON, Primary Examiner

U.S. Cl. X.R.

229—51 D, 55, 58